July 8, 1930.　　　　G. W. MILLER　　　　1,770,003

FISHING LURE

Filed Oct. 25, 1928

Inventor
G. W. Miller
By Watson E. Coleman
Attorney

Patented July 8, 1930

1,770,003

UNITED STATES PATENT OFFICE

GEORGE W. MILLER, OF EVERETT, WASHINGTON

FISHING LURE

Application filed October 25, 1928. Serial No. 315,064.

This invention relates to fishing lures and more particularly to a trolling or casting lure so constructed that it very closely approximates in its operation the action of a moving minnow and, at the same time, is so constructed that it constantly flashes when in operation and directs such flashes in all directions from its surface.

A further object of the invention is to provide a structure of this character, the body of which may be produced from a single sheet of sheet metal by a simple stamping operation and which is of such character that it may be very readily manufactured in various colors to suit fishing conditions and the desires of the fisherman.

A further and more specific object of the invention is to provide a metallic lure having a longitudinally undulate body giving thereto a motion when drawn through the water simulating the action of a live minnow, the construction of the body to provide the undulations being such that a series of angularly disposed facets are produced which, during movement of the body, emit flashes, attracting the attention of the fish.

A further object of the invention is to produce a lure which may be interchangeably employed as either a fast or slow moving bait simply by the reversal of the positions of the hook and swivel thereon.

These and other objects I attain by the construction shown in the accompanying drawing, wherein for the purpose of illustration is shown a preferred embodiment of my invention and wherein:—

Figure 1:
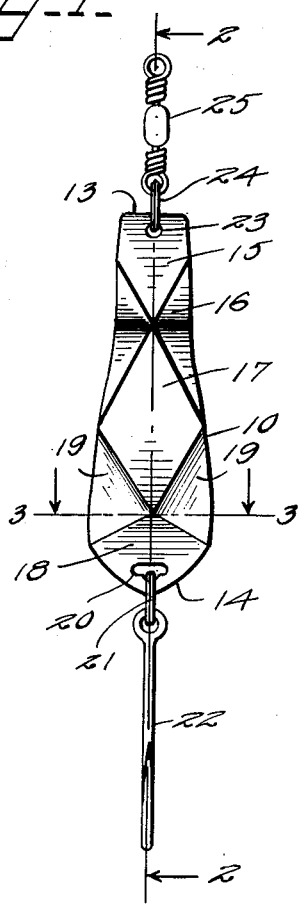
Figure 1 is a side elevation of a fishing lure constructed in accordance with my invention.
Figure 2:
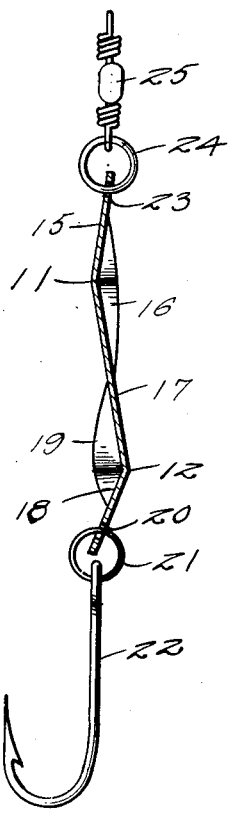
Figure 2 is a section on the line 2—2 of Figure 1.
Figure 3:
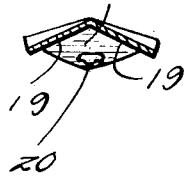
Figure 3 is a section on the line 3—3 of Figure 1.

Referring now more particularly to the drawing, the numeral 10 generally designates a body comprising an icthiform sheet of metal of any desired character and which may be plated in any suitable colors, such as brass, gold, copper, silver and the like, which body may also, if desired, be enameled in colors after production thereof. The body, upon its longitudinal axis, is undulate or zigzag form, as more clearly shown in Figure 2, producing upon this axis apices 11 and 12 located adjacent the head and tail ends 13 and 14 of the sheet respectively. These apices each lie at the junction point of a plurality of facets and the apex 11 lies at the center of a group of facets, designated at 15, 16 and 17.

The facet 15 forms the extreme head portion of the sheet, the facet 16 the sides of this portion and the facet 17 the central body portion of the sheet. The apex 12 has concentered thereon facets 18, 19 and the facet 17 hereinbefore described. The facet 18 forms the extreme tail portion of the sheet while the facets 19 form the sides of this portion and join the facet 17 at their side edges. Each of the facets concentered upon an apex 11 or 12 is disposed at an angle to adjacent facets such that a substantially pyramidal structure is produced surrounding this apex, and in each instance, the side forming facets 16 or 19 are of arcuate formation in longitudinal section with their convex surfaces arranged innermost or in opposition, with the result that the edge of the sheet is undulate and the undulations of this edge portion are staggered with respect to the undulations of the body portion at the apices thereof, producing a spoon-shaped recess and a channel at opposite faces of the lure. A trefoil aperture 20 is formed in the tail end, this aperture being particularly adapted for the reception of a ring 21, by means of which the hook 22 may be applied, while the head end is apertured at 23 for the reception of a ring 24 permitting the connection of a swivel 25 to such head end. With the hook and line attaching swivel attached in the manner just described, the lure becomes a high speed lure and may be trolled or retrieved in casting very rapidly. By reversing the position of the hook and swivel, this lure becomes a low speed lure, requiring a greater time for recovery from the zigzag movements and must be trolled or retrieved in casting at a slower speed, thus adapting it for use with slower moving game fish. In alignment with the opening 20, the facet 15 is preferably transversely flexed to increase the surface of the facet 17, which is exposed in operation.

It will be obvious that in operation, the longitudinal undulation of the body upon its axis and the spoon-shaped recesses formed at opposite faces thereof will cause a distinct zigzag operation of the body, causing, to a great extent, a resemblance to the movement of minnows through the water and this resemblance is increased, due to the fact that the hook, being free to swing upon the body, "whips" from said to side and resembles the operation of the tail of the minnow. It has been found in practice that a lure of this character will operate on edge, that is to say, the outline of the sheet will appear in elevation when viewed in the same horizontal level, thus presenting it to the view of the fish in the most desirable manner. The many facets produced upon the face insure the proper presentation of one of these facets at such an angle that a flash will be transmitted in the general direction of any adjacent fish, thus attracting his attention to the lure and materially increasing the possibilities of success. It has further been found that by use of the trefoil opening above described, the hook may have a maximum freedom during operation of the lure and, at the same time, will not hang or catch upon the body of the lure in such manner that it will become ineffective.

Attention is directed to the fact that in the present illustration, the central facet 17 of the body is diamond-shaped in form and the end and side portions thereof triangular in form. I have found in practice that a construction of this character is particularly attractive and lends itself to very ready construction in the production of the lure.

From the foregoing description, taken in connection with the accompanying drawing, it will be apparent that the lure comprises a front reaction portion 15 inclining downwardly and forwardly from the front end of the body portion 17 and having rearwardly converging side edges meeting at the front end of the body portion, a rear reaction portion 18 inclining upwardly and rearwardly from the rear end of the body portion and having forwardly converging side edges meeting at the rear end of the body portion, front lateral reaction portions 16 located between the rearwardly converging edges of the front reaction portion and the forwardly converging edges of the body portion, and rear lateral reaction portions 19 located between the forwardly converging edges of the rear reaction portion and the rearwardly converging edges of the body portion. The front lateral reaction portions 16 incline downwardly and outwardly and have convex lower surfaces and concave upper surfaces. The rear lateral reaction portions 19 incline upwardly and outwardly and have concave lower surfaces and convex upper surfaces. These reaction portions are of such formation and so related with respect to each other and with respect to the body portion that they hold the lure against revolving and cause it to move through the water with a gentle zigzag and rocking motion. This motion causes the lure to closely resemble a herring while swimming, and due thereto especially adapts the lure for use in salmon fishing. Furthermore, these reaction portions impart this gentle zigzag and rocking motion to the lure whether it is being drawn slowly or rapidly through the water.

While I have illustrated and described the preferred construction of the invention, it will be understood that by employing the principle of construction hereinbefore set forth, many modifications of this structure are possible.

By employing a sheet of different width, the operation of the lure may be considerably modified and by varying the angles of the radiating ridges between facets concentering upon a given peak, differentiations in operation can likewise be produced. Since such modification is readily possible, I do not limit myself to the particular construction hereinbefore set forth except as hereinafter claimed.

I claim:—

1. A fishing lure, comprising a body portion, a front reaction portion extending downwardly and forwardly from the body portion, a rear reaction portion extending upwardly and rearwardly from the body portion, lateral reaction portions located between the body and front reaction portions and inclining downwardly and outwardly, and lateral reaction portions located between the body and rear reaction portion and inclining upwardly and outwardly.

2. A fishing lure, comprising a body portion, a front reaction portion extending downwardly and forwardly from the body portion, a rear reaction portion extending upwardly and rearwardly from the body portion, lateral reaction portions located between the body and front reaction portion and inclining downwardly and outwardly, and lateral reaction portions located between the body and rear reaction portion and inclining upwardly and outwardly, said first lateral reaction portions having convex lower sides and concave upper sides, and said second lateral reaction portions having concave lower sides and convex upper sides.

3. A fishing lure, comprising a body of diamond formation in contour, a front reaction portion inclining downwardly and forwardly from the front apex of the body and having rearwardly converging lateral edges meeting at said apex, lateral reaction portions located between the front edges of the body portion and said edges of the front reaction portion and having convex lower sides and concave upper sides and inclining downwardly and outwardly, a rear reaction portion inclining upwardly and rearwardly from the rear apex of the body and having forwardly converging lateral edges meeting at said apex, and lateral reaction portions located between the rear edges of the body portion and said edges of the rear reaction portion and having concave lower surfaces and convex upper surfaces and inclining upwardly and outwardly.

In testimony whereof I hereunto affix my signature.

GEORGE W. MILLER.